Patented Oct. 13, 1953

2,655,534

UNITED STATES PATENT OFFICE 2,655,534

PREPARATION OF N-AROMATIC-N'-ALIPHATIC HYDROCARBON UREAS

Norman E. Searle, Wilmington, Del., assignor to E. I. du Pont de Nemours and Company, Wilmington, Del., a corporation of Delaware No Drawing. Application October 25, 1951, Serial No. 253,203

15 Claims. (Cl. 260—553)

This invention relates to processes for preparing unsymmetrically substituted ureas and more particularly to a new method of preparing N-aromatic-N'-aliphatic ureas.

Many unsymmetrically substituted ureas, and in particular N-aromatic-N'-alkylureas, have recently been shown to be useful as bactericides and pesticides and also to possess valuable plant growth regulant properties and herbicidal activity (U. S. patent applications Ser. No. 131,498, filed by C. W. Todd on December 6, 1949, now abandoned, and Ser. No. 186,118, filed by H. E. Cupery et al. on September 21, 1950). However, there are very few methods available for preparing unsymmetrical ureas of this type. The usual method consists in reacting the appropriate aromatic isocyanate with the appropriate alkylamine. This method has the disadvantage that the preparation of the aromatic isocyanates requires the use of phosgene, a corrosive and toxic gas, and that the reaction evolves hydrogen chloride. Accordingly, equipment corrosion losses are extreme; and the capital outlay for the specially fabricated equipment required for reasonably safe handling of phosgene reactions is very high.

It is an object of this invention to provide a new method for preparing N-aromatic-N'-aliphatic ureas. A further object is to provide a process for preparing N-aromatic-N'-aliphatic ureas which avoids the use of isocyanates and therefore of the hazardous and corrosive phosgene. Another object is to provide a process for preparing N-aromatic-N'-aliphatic ureas in high yields directly from the corresponding amines. Other objects will appear hereinafter.

These objects are accomplished by the following invention of a process for preparing N-aromatic-N'-aliphatic ureas which comprises heating and reacting under substantially anhydrous conditions and at a temperature above 50° C. an aliphatic hydrocarbon amine salt of an N-aliphatic hydrocarbon monothiocarbamic acid with an aromatic amine having hydrogen on the amino nitrogen and having the amino group attached directly to nuclear carbon, and isolating the resulting N-aromatic-N'-aliphatic hydrocarbon urea. In a preferred form of this invention an alkylamine salt of an N-alkyl monothiocarbamic acid is heated and reacted under substantially anhydrous conditions at a temperature above 50° C. with an aromatic amine having hydrogen on the amino nitrogen and having the amino group attached directly to nuclear carbon, and the resulting N-aromatic-N'-alkylurea isolated.

While the mechanism is not known with certainty, the reaction can be represented by the following equation:

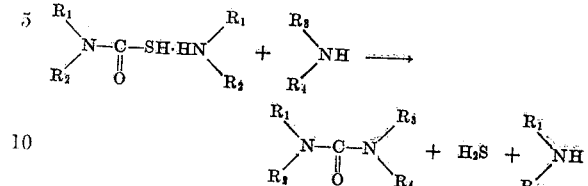

where $R_1$ is an alkyl or monoalkenyl radical, $R_2$ and $R_3$ are hydrogen or alkyl or monoalkenyl radicals, and $R_4$ is an aromatic radical.

There are at least six products formally possible from this reaction:

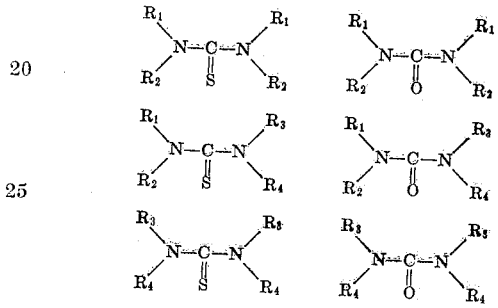

It has been quite unexpectedly found, however, that if the reaction is carried out as described herein, high yields of the desired unsymmetrical oxygen ureas are obtained and very little, if any, of the remaining five possible products are formed.

As is known (see, for example, Anschütz in Ann. 359, 202 (1908)), the alkylamine salts of N-alkylthiocarbamic acid may be prepared by reacting one mole of carbon oxysulfide with two moles of an aliphatic amine having hydrogen on the amino nitrogen. These compounds are relatively stable and can, if desired, be isolated as crystalline materials by carrying out the reaction in a medium, such as ether or petroleum ether, in which they are insoluble. For the purpose of this invention, the alkylamine salts of N-alkylthiocarbamic acid can be isolated by this or similar methods, but this is in general unnecessary and uneconomical. It is preferable to form the alkylamine salt of the N-alkylthiocarbamic acid by reacting carbon oxysulfide with a primary or secondary aliphatic hydrocarbon amine and to treat it directly, without isolation or purification, with the aromatic amine.

The reaction between the N-alkylthiocarbamic acid salt and the aromatic amine is preferably carried out with the two reactants in substantially equimolar ratio. Of course, one or the other reactant can be used in excess if desired, but if this is done the yield based on the reactant will be correspondingly decreased. An inert solvent or diluent is preferably, although not necessarily, employed to facilitate contact. This is desirably a liquid in which both reactants are appreciably soluble, for example, an aromatic or alicyclic hydrocarbon such as benzene, toluene, the xylenes or cyclohexane, an alcohol such as methanol or ethanol, or a heterocyclic-aromatic compound such as pyridine, furan, tetrahydrofuran, and the like. However, the reaction medium need not be a solvent for both reactants and reaction product. Thus, it can be an aliphatic hydrocarbon such as n-hexane or kerosene, or an ether such as diethyl ether or di-n-butyl ether, or another inert diluent such as carbon tetrachloride. The quantity of solvent or diluent is largely immaterial as long as there is enough of it to maintain good contact. In general, it is satisfactory to use from one to ten parts by weight of diluent for each part of total reactants. Reactants and reaction medium should be substantially anhydrous, i. e., they should not contain more than about 2% of water by weight in order to prevent hydrolytic side reactions.

The reaction proceeds at an unpracticably slow rate at temperatures below about 50° C., and it is therefore desirable to operate above that temperature. A generally satisfactory temperature range is that between 75 and 150° C., although higher temperatures, e. g., 200° C., can be used if desired. At the higher temperatures, or with volatile solvents, the reaction can be carried out in sealed vessels under the autogenous pressure developed, but in general it is carried out at atmospheric pressure. The progress of the reaction can be followed readily by the evolution of hydrogen sulfide and aliphatic amine. Heating is discontinued when this evolution has substantially ceased, although the reaction can be stopped prior to that point if desired. The aliphatic amine evolved can be recovered and reused in a subsequent reaction with carbon oxysulfide.

The reaction product, i. e., the N-aromatic-N'-aliphatic urea, can be isolated by any suitable means, such as direct crystallization by cooling the reaction mixture, or by mixing with a non-solvent for the urea, or by evaporation of the solvent used, if any. The N-aromatic-N'-aliphatic urea is generally obtained in good yields and sufficiently pure for most uses.

The invention is described in greater detail in the following illustrative example, in which parts are by weight.

*Example*

To a solution of 1.4 parts of carbon oxysulfide in 20 parts of toluene was added at room temperature a solution of 2.2 parts of dimethylamine in 20 parts of toluene. The dimethylamine salt of N,N-dimethylthiocarbamic acid,

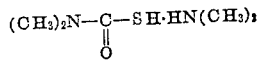

which is soluble in toluene, remained in solution.

To the solution was then added 2.9 parts of p-chloroaniline, and the reaction mixture was heated under reflux with stirring at a temperature of 80–98° C. for three and a quarter hours. During this period, hydrogen sulfide and dimethylamine were evolved, and heating was discontinued when the gas evolution had substantially ceased. On cooling the reaction mixture, a crystalline precipitate formed which, after filtering and washing with dioxane, then with ether, was found to consist of 1.8 parts of 3-(p-chlorophenyl)-1,1-dimethylurea, identified by its melting point, 170–171° C., and mixed melting point with an authentic sample. The toluene filtrate was poured into water and, upon evaporation of the toluene, yielded a second crop of 1.0 part of slightly less pure 3-(p-chlorophenyl)-1,1-dimethylurea. From the aqueous solution, which was slightly acid, was obtained by neutralization 0.4 part of unreacted p-chloroaniline. The yield of 3-(p-chlorophenyl)-1,1-dimethylurea, based on the unrecovered p-chloroaniline, was 72.5% of the calculated.

The process of this invention is generally applicable to the preparation of N-aromatic-N'-aliphatic ureas from primary or secondary aliphatic amines and primary aromatic amines or secondary arylaliphatic amines having the amino group directly attached to nuclear carbon. Additional examples of N-aromatic-N'-aliphatic hydrocarbon ureas which can be prepared by the method of this invention include those in the following table:

| Aliphatic Amine | Aromatic Amine | Urea Product |
|---|---|---|
| Diemethylamine | Aniline | 3-Phenyl-1,1-dimethylurea. |
| Methylamine | do | 3-Phenyl-1-methylurea. |
| Isopropylamine | do | 3-Phenyl-1-isopropylurea.* |
| n-Butylamine | do | 3-Phenyl-1-n-butylurea. |
| n-Dodecylamine | do | 3-Phenyl-1-n-dodecylurea. |
| Dimethylamine | m-Toluidine | 3-(m-Tolyl)-1,1-dimethylurea. |
| Allylamine | p-Toluidine | 3-(p-Tolyl)-1-allylurea. |
| Diethylamine | p-Ethylaniline | 3-(p-Ethylphenyl)-1,1-diethylurea. |
| Dimethylamine | 2-Napthylamine | 3-(2-Naphthyl)-1,1-dimethylurea. |
| Do | 2-Phenylaniline | 3-(2-Biphenyl)-1,1-dimethylurea. |
| Methylamine | p-Chloroaniline | 3-(p-Chlorophenyl)-1-methylurea. |
| Methylethylamine | do | 3-(p-Chlorophenyl)-1-methyl-1-ethylurea. |
| Diethylamine | do | 3-(p-Chlorophenyl)-1,1-diethylurea. |
| Diallylamine | do | 3-(p-Chlorophenyl)-1,1-diallylurea. |
| Dicyclohexylamine | do | 3-(p-Chlorophenyl)-1,1-dicyclohexylurea. |
| Di-n-octylamine | do | 3-(p-Chlorophenyl)-1,1-di-n-octylurea. |
| Diisopropylamine | o-Chloroaniline | 3-(o-Chlorophenyl)-1,1-diisopropylurea. |
| Dimethylamine | 3-Chloro-4-tert. butylaniline | 3-(3-Chloro-4-tert. butyl)-1,1-dimethylurea. |
| Di-n-butylamine | m-Fluoroaniline | 3-(m-Fluorophenyl)-1,1-di-n-butylurea. |
| Diethylamine | p-Bromoaniline | 3-(p-Bromophenyl)-1,1-diethylurea. |
| Dimethylamine | 2,4-Dichloro-aniline | 3-(2,4-Dichlorophenyl)-1,1-dimethylurea. |
| Do | 3,4-Dichloroaniline | 3-(3,4-Dichlorophenyl)-1,1-dimethylurea. |
| Diethylamine | 2,4,6-Trichloroaniline | 3-(2,4,6-Trichlorophenyl)-1,1-diethylurea. |
| Dimethylamine | 4-Chloronaphthylamine | 3-(4-Chloronaphthyl)-1,1-dimethylurea. |
| Do | p-Methoxyaniline | 3-(p-Methoxyphenyl)-1,1-dimethylurea. |
| Do | o-Ethoxyaniline | 3-(o-Ethoxyphenyl)-1,1-dimethylurea. |
| Do | p-Butoxyaniline | 3-(p-Butoxyphenyl)-1,1-dimethylurea. |
| Do | N-methylaniline | 3-Phenyl-3-methyl-1,1-dimethylurea. |
| Ethylamine | N-ethylaniline | 3-Phenyl-3-ethyl-1-ethylurea. |

The process of this invention comprises broadly the reaction of an alkylamine salt of an N-alkylthiocarbamic acid, said reactant having the formula

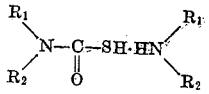

where $R_1$ is an aliphatic hydrocarbon radical, particularly an alkyl or monoalkenyl radical and $R_2$ is hydrogen or an aliphatic hydrocarbon radical, particularly an alkyl or monoalkenkyl radical, with an aromatic amine of the formula

where $R_3$ is hydrogen or an aliphatic hydrocarbon radical, particularly an alkyl or alkenyl radical and $R_4$ is an aromatic radical. For practical reasons of accessibility and cost, it is preferred that the radical $R_1$ be an alkyl or monoalkenyl radical of one to eight carbon atoms and still more preferably one to four carbon atoms, and that $R_2$ and $R_3$, when not hydrogen, also be alkyl or monoalkenyl of one to eight carbon atoms, and still more preferably of one to four carbon atoms. For the same reasons, it is preferred that $R_4$ be an aromatic radical of one to two six-membered nuclei, and be either an unsubstituted aryl radical or an aryl radical substituted by alkyl radicals of one to four carbon atoms, alkoxy radicals of one to four carbon atoms, or halogen (fluorine, chlorine, or bromine) atoms.

The invention is particularly useful in the production of unsymmetrical ureas having outstanding herbicidal action. Such preferred herbicidal compounds may be prepared, according to the process of this invention, by using as starting materials dialkylamines

where $R_1$ and $R_2$ are alkyl groups of one to two carbon atoms, i. e., methyl or ethyl, and aromatic amines

where $R_3$ is hydrogen and $R_4$ is phenyl or phenyl having from one to two substituents, the latter being fluorine, chlorine or alkyl groups of one to two carbon atoms, i. e., methyl or ethyl.

This invention provides a simple and effective method of preparing unsymmetrical N-aromatic-N'-aliphatic ureas. It is also a low-cost route to these compounds, since carbon oxysulfide is obtainable from carbon monoxide and sulfur, or from sulfur dioxide and hot charcoal.

As many apparently widely different embodiments of this invention may be made without departing from the spirit and scope thereof, it is to be understood that this invention is not limited to the specific embodiments thereof except as defined in the appended claims.

I claim:

1. A process for preparing an N-aromatic-N'-aliphatic hydrocarbon urea which comprises heating and reacting under substantially anhydrous conditions and at a temperature above 50° C. an aliphatic hydrocarbon amine salt of an N-aliphatic hydrocarbon monothiocarbamic acid with a carbocyclic aromatic amine of 1 to 2 six-membered nuclei having hydrogen on the amino nitrogen and having the amino group attached directly to nuclear carbon, and isolating the resulting N-aromatic-N'-aliphatic hydrocarbon urea.

2. A process for preparing an N-aromatic-N'-alkylurea which comprises heating and reacting under substantially anhydrous conditions and at a temperature above 50° C. an alkylamine salt of an N-alkyl monothiocarbamic acid with a carbocyclic aromatic amine of 1 to 2 six-membered nuclei having hydrogen on the amino nitrogen and having the amino group attached directly to nuclear carbon, and isolating the resulting N-aromatic-N'-alkylurea.

3. A process for preparing 3-(p-chlorophenyl)-1,1-dimethylurea which comprises heating and reacting under substantially anhydrous conditions and at a temperature above 50° C. the dimethylamine salt of N,N-dimethylthiocarbamic acid with p-chloroaniline, and isolating the resulting 3-(p-chlorophenyl)-1,1-dimethylurea.

4. A process for preparing an N-aromatic-N'-aliphatic hydrocarbon urea which comprises reacting, in an inert substantially anhydrous solvent, carbon oxysulfide with an aliphatic hydrocarbon amine having hydrogen on the amino nitrogen thereby forming in said solvent the aliphatic hydrocarbon amine salt of the N-aliphatic hydrocarbon monothiocarbamic acid, adding directly thereto a carbocyclic aromatic amine of 1 to 2 six-membered nuclei having hydrogen on the amino nitrogen and having the amino group attached directly to nuclear carbon, heating and reacting said aliphatic hydrocarbon amine salt of the N-aliphatic hydrocarbon monothiocarbamic acid with said aromatic amine in said substantially anhydrous solvent at a temperature above 50° C., and isolating the resulting N-aromatic-N'-aliphatic hydrocarbon urea.

5. A process for preparing an N-aromatic-N'-alkylurea which comprises reacting, in an inert substantially anhydrous solvent, carbon oxysulfide with an alkylamine having hydrogen on the amino nitrogen, thereby forming in said solvent the alkylamine salt of the N-alkyl monothiocarbamic acid, adding directly thereto a carbocyclic aromatic amine of 1 or 2 six-membered nuclei having hydrogen on the amino nitrogen and having the amino group attached directly to nuclear carbon, heating and reacting said alkylamine salt of the N-alkyl monothiocarbamic acid with said aromatic amine in said substantially anhydrous solvent at a temperature above 50° C., and isolating the resulting N-aromatic-N'-alkylurea.

6. A process for preparing 3-(p-chlorophenyl)-1,1-dimethylurea which comprises reacting, in an inert substantially anhydrous solvent, carbon oxysulfide with dimethylamine, thereby forming in said solvent the dimethylamine salt of N,N-dimethylthiocarbamic acid, adding directly thereto p-chloroaniline, heating and reacting the dimethylamine salt of N,N-dimethylthiocarbamic acid with said p-chloroaniline in said substantially anhydrous solvent at a temperature above 50° C., and isolating the resulting 3-(p-chlorophenyl)-1,1-dimethylurea.

7. A process for preparing an N-aromatic-N'-aliphatic hydrocarbon urea which comprises heating and reacting, under substantially anhydrous conditions and at a temperature above 50° C., an aliphatic hydrocarbon amine salt of an N-aliphatic hydrocarbon monothiocarbamic acid with a carbocyclic aromatic amine of 1 to 2 six-membered nuclei having hydrogen on the amino nitrogen and having the amino group attached directly to nuclear carbon, thereby forming an N-aromatic-N'-aliphatic hydrocarbon urea and an aliphatic hydrocarbon amine, isolating said N-aromatic-N'-aliphatic hydrocarbon urea, reacting said aliphatic hydrocarbon amine with carbon oxysulfide, thereby forming the aliphatic hydrocarbon amine salt of the N-aliphatic hydrocarbon monothiocarbamic acid and subjecting the thus formed aliphatic hydrocarbon amine salt of the N-aliphatic hydrocarbon monothiocarbamic acid to reaction with an aromatic amine as aforesaid.

8. A process for preparing an N-aromatic-N'-alkylurea which comprises heating and reacting under substantially anhydrous conditions and at a temperature above 50° C. an alkylamine salt of an N-alkyl monothiocarbamic acid with a carbocyclic aromatic amine of 1 to 2 six-membered nuclei having hydrogen on the amino nitrogen and having the amino group attached directly to nuclear carbon, thereby forming an N-aromatic-N'-alkylurea and an alkylamine, isolating said N-aromatic-N'-alkylurea, reacting said alkylamine with carbon oxysulfide thereby forming the alkylamine salt of the N-alkyl monothiocarbamic acid and subjecting the thus formed alkylamine salt of the N-alkyl monothiocarbamic acid to reaction with an aromatic amine as aforesaid.

9. A process for preparing 3-(p-chlorophenyl)-1,1-dimethylurea which comprises heating and reacting under substantially anhydrous conditions and at a temperature above 50° C. the dimethylamine salt of N-dimethylthiocarbamic acid with p-chloroaniline, thereby forming 3-(p-chlorophenyl)-1,1-dimethylurea and dimethylamine, reacting said dimethylamine with carbon oxysulfide thereby forming the dimethylamine salt of N,N'-dimethylthiocarbamic acid and subjecting the thus formed dimethylamine salt of N-dimethylthiocarbamic acid to reaction with p-chloroaniline as aforesaid.

10. A process for preparing an N-aromatic-N'-aliphatic hydrocarbon urea which comprises reacting, in an inert substantially anhydrous solvent, carbon oxysulfide with an aliphatic hydrocarbon amine having the formula $R_1$—NH—$R_2$ wherein $R_1$ is selected from the class consisting of alkyl and monoalkenyl radicals of 1 to 8 carbon atoms and $R_2$ is selected from the class consisting of hydrogen and alkyl and monoalkenyl radicals of 1 to 8 carbon atoms, thereby forming in said solvent the aliphatic hydrocarbon amine salt of the N-aliphatic hydrocarbon monothiocarbamic acid, adding directly thereto an aromatic amine having the formula $R_3$—NH—$R_4$ wherein $R_3$ is selected from the class consistnig of hydrogen and alkyl and monoalkenyl radicals of 1 to 8 carbon atoms and $R_4$ is a carbocyclic aromatic radical of 1 to 2 six-membered nuclei selected from the class consisting of aryl, haloaryl, aryl substituted by alkyl of 1 to 4 carbon atoms, and aryl substituted by alkoxy of 1 to 4 carbon atoms, heating and reacting said aliphatic hydrocarbon amine salt of the N-aliphatic hydrocarbon monothiocarbamic acid with said aromatic amine in said substantially anhydrous solvent at a temperature above 50° C., and isolating the resulting N-aromatic-N'-aliphatic hydrocarbon urea.

11. A process for preparing an N-aromatic-N'-dialkylurea which comprises reacting, in an inert substantially anhydrous solvent, carbon oxysulfide with a dialkylamine having the formula $R_1$—NH—$R_2$ wherein $R_1$ and $R_2$ are alkyl groups of 1 to 2 carbon atoms, thereby forming in said solvent the dialkylamine salt of the N-dialkyl monothiocarbamic acid, adding directly thereto an aromatic amine having the formula $$R_3—NH—R_4$$

wherein $R_3$ is hydrogen and $R_4$ is an aromatic radical selected from the class consisting of phenyl and phenyl having from 1 to 2 substituents selected from the class consisting of fluorine, chlorine and alkyl groups of 1 to 2 carbon atoms, heating and reacting said dialkylamine salt of the N-dialkyl monothiocarbamic acid with said aromatic amine in said substantially anhydrous solvent at a temperature above 50° C., and isolating the resulting N-aromatic-N'-dialkylurea.

12. A process for preparing an N-aromatic-N'-aliphatic hydrocarbon urea which comprises heating and reacting, under substantially anhydrous conditions and at a temperature above 50° C., an aliphatic hydrocarbon amine salt of an N-aliphatic hydrocarbon monothiocarbamic acid having the formula

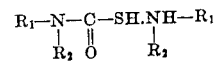

wherein $R_1$ is selected from the class consisting of alkyl and monoalkenyl radicals of 1 to 8 carbon atoms and $R_2$ is selected from the class consisting of hydrogen and alkyl and monoalkenyl radicals of 1 to 8 carbon atoms, with an aromatic amine having the formula $R_3$—NH—$R_4$ wherein $R_3$ is selected from the class consisting of hydrogen and alkyl and monoalkenyl radicals of 1 to 8 carbon atoms and $R_4$ is a carbocyclic aromatic radical of 1 to 2 six-membered nuclei selected from the class consisting of aryl, haloaryl, aryl substituted by alkyl of 1 to 4 carbon atoms, and aryl substituted by alkoxy of 1 to 4 carbon atoms, and isolating the resulting N-aromatic-N'-aliphatic hydrocarbon urea.

13. A process for preparing an N-aromatic-N'-dialkylurea which comprises heating and reacting under substantially anhydrous conditions and at a temperature above 50° C., a dialkyl amine salt of an N-dialkyl monothiacarbamic acid having the formula

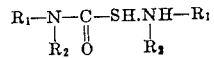

wherein $R_1$ and $R_2$ are alkyl groups of 1 to 2 carbon atoms, with an aromatic amine having the formula $R_3$—NH—$R_4$ wherein $R_3$ is hydrogen and $R_4$ is an aromatic radical selected from the class consisting of phenyl and phenyl having from 1 to 2 substituents selected from the class consisting of fluorine, chlorine and alkyl groups of 1 to 2 carbon atoms, and isolating the resulting N-aromatic-N'-dialkylurea.

14. A process for preparing an N-aromatic-N'-aliphatic hydrocarbon urea which comprises heating and reacting, under substantially anhydrous conditions and at a temperature above 50° C., an aliphatic hydrocarbon amine salt of an N-aliphatic hydrocarbon monothiocarbamic acid having the formula

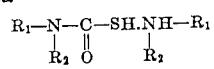

where in $R_1$ is selected from the class consisting of alkyl and monoalkenyl radicals of 1 to 8 carbon atoms and $R_2$ is selected from the class consisting of hydrogen and alkyl and monoalkenyl radicals of 1 to 8 carbon atoms, with an aromatic amine having the formula $R_3$—NH—$R_4$ wherein $R_3$ is selected from the class consisting of hydrogen and alkyl and monoalkenyl radicals of 1 to 8 carbon atoms and $R_4$ is a carbocyclic aromatic radical of 1 to 2 six-membered nuclei selected from the class consisting of aryl, haloaryl, aryl substituted by alkyl of 1 to 4 carbon atoms, and aryl substituted by alkoxy of 1 to 4 carbon atoms, thereby forming an N-aromatic-N'-aliphatic hydrocarbon urea and an aliphatic hydrocarbon amine having the formula $R_1$—NH—$R_2$, wherein $R_1$ and $R_2$ are defined as aforesaid, isolating said N-aromatic-N'-aliphatic hydrocarbon urea, reacting said aliphatic hydrocarbon amine with carbon oxysulfide, thereby forming the aliphatic hydrocarbon amine salt of the N-aliphatic hydrocarbon monothiocarbamic acid and subjecting the thus formed aliphatic hydrocarbon amine salt of the N-aliphatic hydrocarbon monothiocarbamic acid to reaction with an aromatic amine as aforesaid.

15. A process for preparing an N-aromatic N'-dialkylurea which comprises heating and reacting under substantially anhydrous conditions and at a temperature above 50° C., a dialkyl amine salt of an N-dialkyl monothiocarbamic acid having the formula

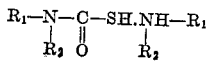

wherein $R_1$ and $R_2$ are alkyl groups of 1 to 2 carbon atoms with an aromatic amine having the formula $R_3$—NH—$R_4$ wherein $R_3$ is hydrogen and $R_4$ is an aromatic radical selected from the class consisting of phenyl and phenyl having from 1 to 2 substituents selected from the class consisting of fluorine, chlorine and alkyl groups of 1 to 2 carbon atoms, thereby forming an N-aromatic-N'-dialkylurea and a dialkylamine having the formula $R_1$—NH—$R_2$ wherein $R_1$ and $R_2$ are defined as aforesaid, isolating said N-aromatic-N'-dialkylurea, reacting said dialkylamine with carbon oxysulfide thereby forming the dialkylamine salt of the N-dialkyl monothiocarbamic acid and subjecting the thus formed dialkylamine salt of the N-dialkyl monothiocarbamic acid to reaction with an aromatic amine as aforesaid.

NORMAN E. SEARLE.

References Cited in the file of this patent

UNITED STATES PATENTS

| Number | Name | Date |
|---|---|---|
| 2,226,835 | Rohm | Dec. 31, 1940 |